US012522125B2

(12) United States Patent
Pignatale et al.

(10) Patent No.: US 12,522,125 B2
(45) Date of Patent: Jan. 13, 2026

(54) LIGHTING ASSEMBLY FOR A VEHICLE AND METHOD FOR REMOVING SUCH A LIGHTING ASSEMBLY FROM SUCH A VEHICLE

(71) Applicant: ITALDESIGN-GIUGIARO S.P.A., Turin (IT)

(72) Inventors: Domenico Pignatale, Moncalieri (IT); Fabio Danna, Moncalieri (IT); Mirko Ballarini, Moncalieri (IT); Stefania Masuelli, Moncalieri (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 0 days.

(21) Appl. No.: 18/569,743

(22) PCT Filed: Jul. 14, 2021

(86) PCT No.: PCT/IB2021/056331
§ 371 (c)(1),
(2) Date: Dec. 13, 2023

(87) PCT Pub. No.: WO2023/285858
PCT Pub. Date: Jan. 19, 2023

(65) Prior Publication Data
US 2024/0286542 A1    Aug. 29, 2024

(51) Int. Cl.
*B60Q 1/04* (2006.01)
*F21S 41/125* (2018.01)
(Continued)

(52) U.S. Cl.
CPC ............ *B60Q 1/045* (2013.01); *F21S 41/125* (2018.01); *F21S 41/16* (2018.01); *F21S 41/24* (2018.01); *F21S 41/285* (2018.01)

(58) Field of Classification Search
CPC ....... B60Q 1/045; B60Q 1/0011; F21S 41/24; F21S 41/16; F21S 41/125; F21S 41/285;
(Continued)

(56) References Cited

U.S. PATENT DOCUMENTS 5,438,485 A    8/1995  Li et al.
5,469,337 A *  11/1995  Cassarly .............. G02B 6/4298
                                                    362/552
(Continued)

FOREIGN PATENT DOCUMENTS

DE         4129955 A1     3/1993
DE     102012205435 A1    10/2013
(Continued)

OTHER PUBLICATIONS

M. Ovidiu, "BMW G30 Cracked Headlight Repair, Lens Replaced", (Jun. 11, 2021), Youtube.com, 14:00-20:00 (Year: 2021).*
(Continued)

*Primary Examiner* — Matthew J. Peerce
(74) *Attorney, Agent, or Firm* — Ballard Spahr LLP

(57) ABSTRACT

A removable lighting assembly for a vehicle is described, comprising: a frame removably mounted on the vehicle, a first lens configured to refract a first light ray incident thereon outside the lighting assembly, and an optical assembly configured to deflect a second light ray from a source arranged outside said frame and to generate the first light ray; said first lens and said optical assembly are fixed to the frame and are removable integrally to said frame from said vehicle.

20 Claims, 3 Drawing Sheets

(51) Int. Cl.
  *F21S 41/16*     (2018.01)
  *F21S 41/20*     (2018.01)
  *F21S 41/24*     (2018.01)

(58) Field of Classification Search
  CPC ...... F21S 41/675; F21S 41/365; F21S 41/635;
  F21S 41/251
  See application file for complete search history.

(56) References Cited

U.S. PATENT DOCUMENTS

| | | | |
|---|---|---|---|
| 9,222,628 B2* | 12/2015 | Li | F21V 33/0068 |
| 11,898,726 B2* | 2/2024 | Suwa | F21S 41/25 |
| 12,000,552 B2* | 6/2024 | Rudy | H01S 5/0087 |
| 2016/0245471 A1* | 8/2016 | Nakazato | F21S 41/18 |
| 2020/0263850 A1* | 8/2020 | Kawaguchi | F21V 9/30 |

FOREIGN PATENT DOCUMENTS

| | | |
|---|---|---|
| EP | 3109541 A1 | 12/2016 |
| EP | 3399226 A1 | 11/2018 |
| WO | 2020250941 A1 | 12/2020 |

OTHER PUBLICATIONS

International Search Report and Written Opinion for International Application No. PCT/IB2021/056331 mailed Mar. 31, 2022.

* cited by examiner

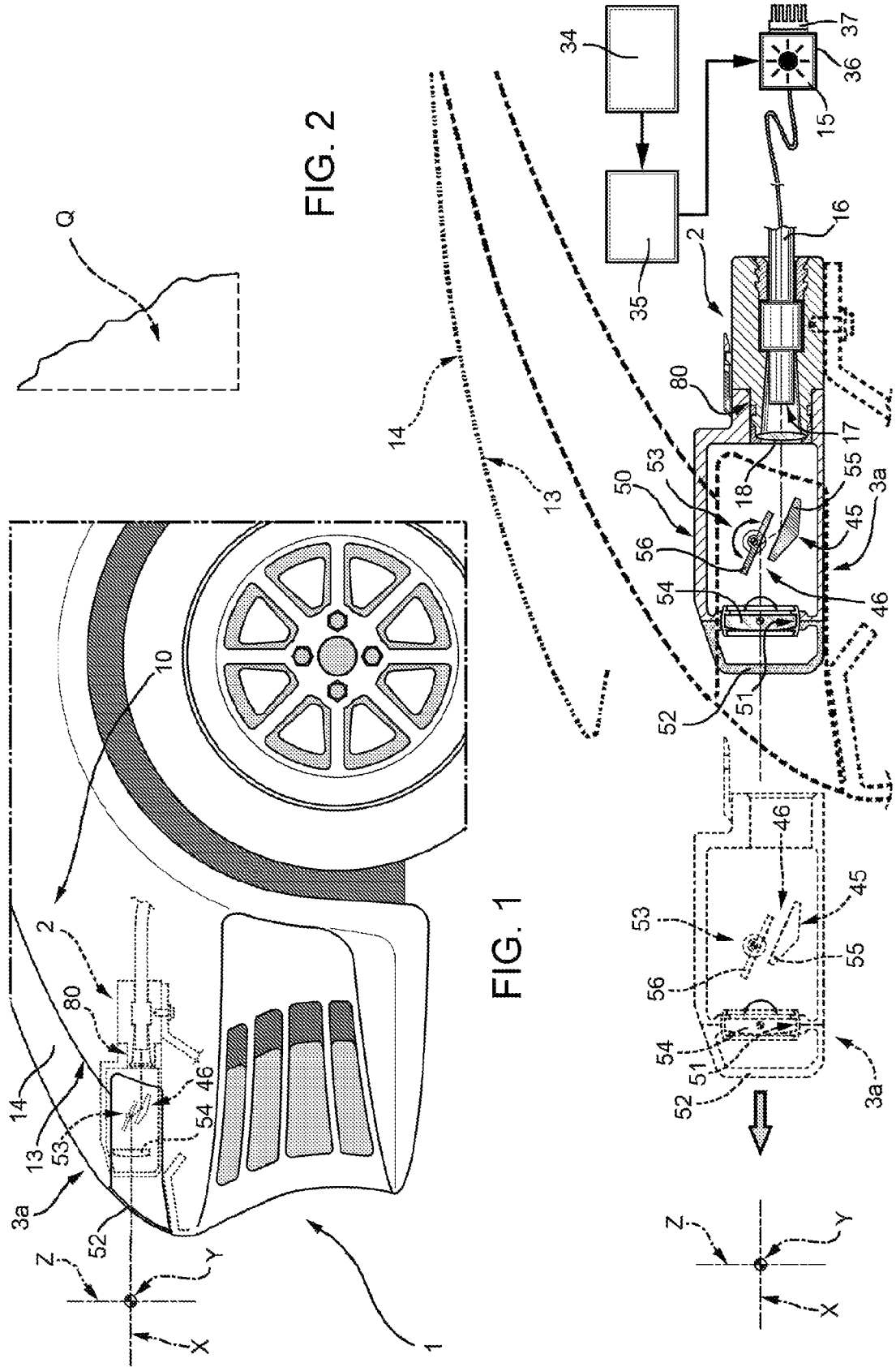

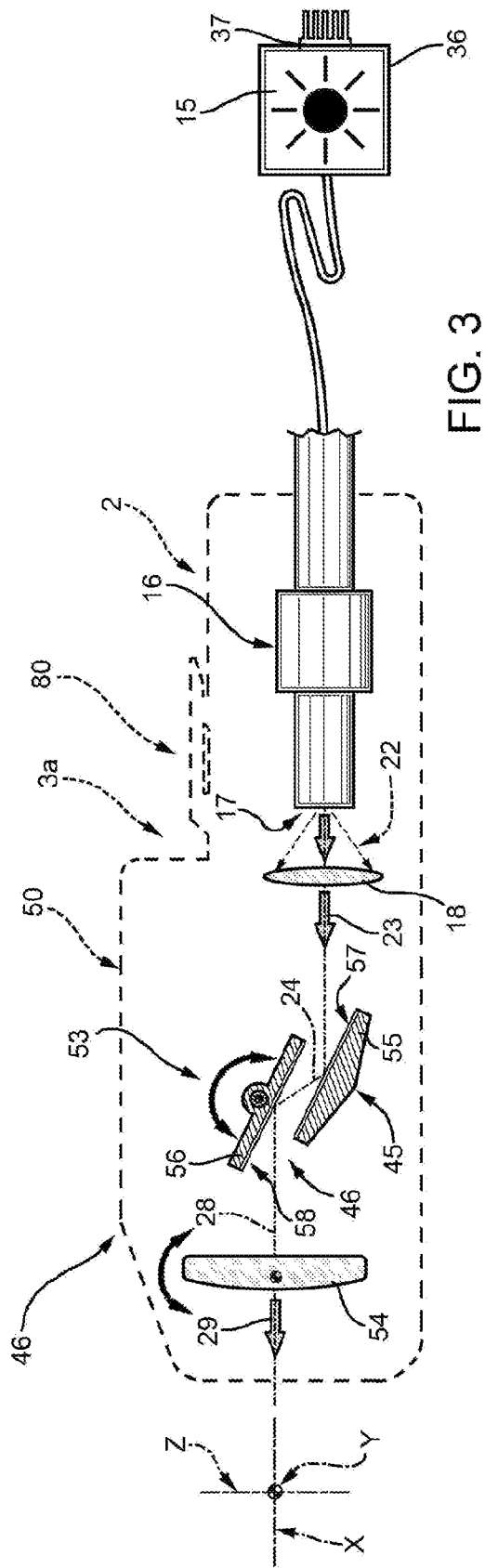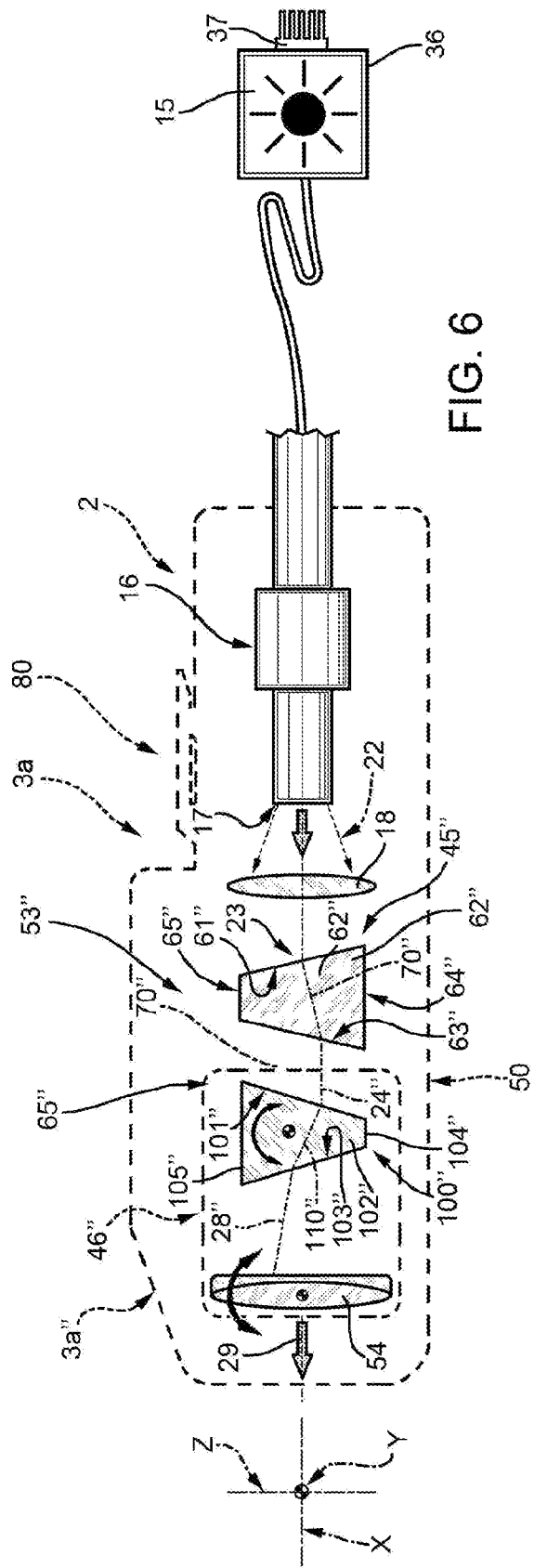

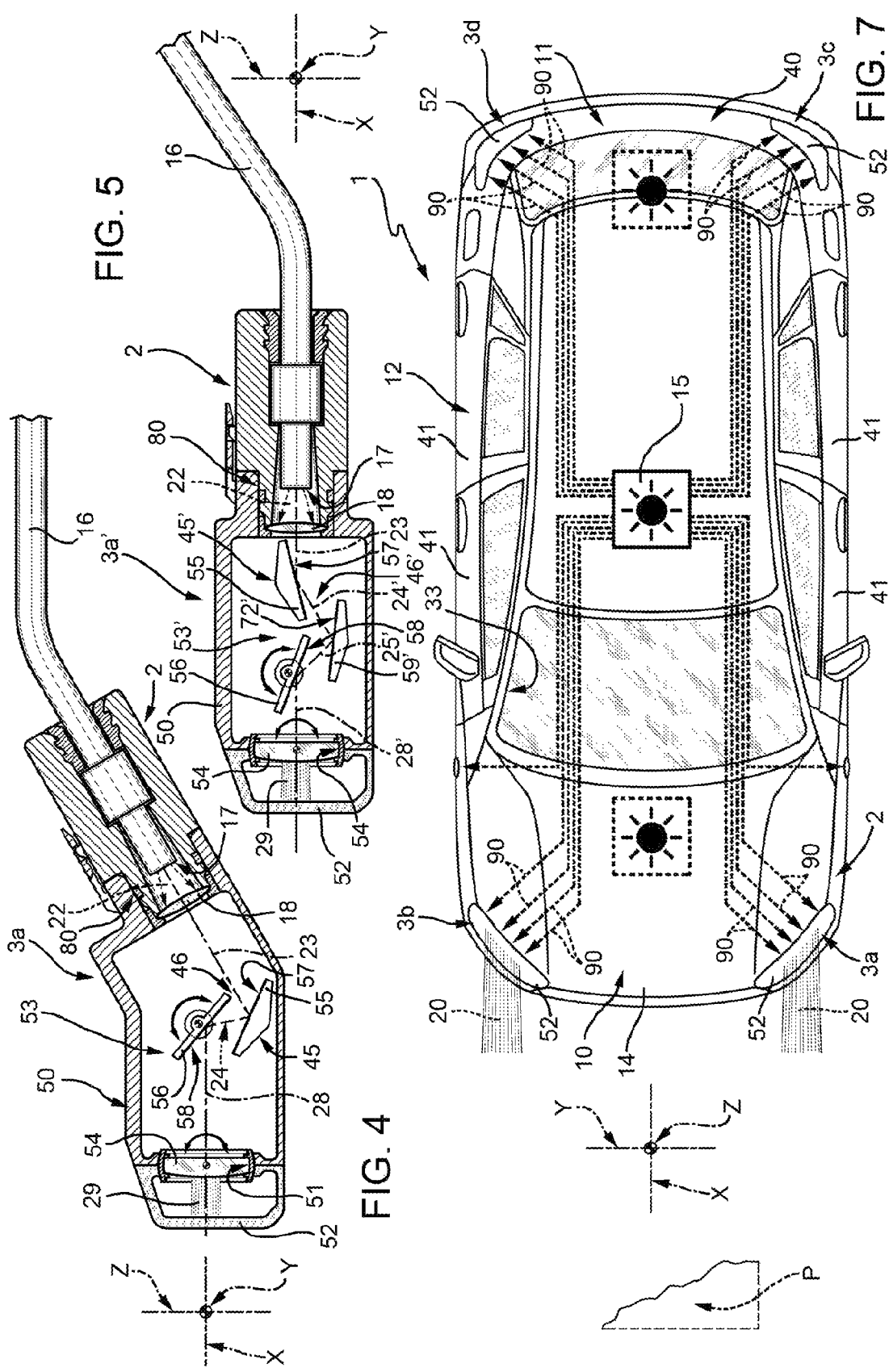

LIGHTING ASSEMBLY FOR A VEHICLE AND METHOD FOR REMOVING SUCH A LIGHTING ASSEMBLY FROM SUCH A VEHICLE

TECHNICAL FIELD

The present invention relates to a removable lighting assembly for a vehicle and to a method for removing a lighting assembly from the vehicle.

In particular, the vehicle could be a land vehicle, for example a motor vehicle or a motorcycle, or a marine vehicle, for example a jet ski.

The lighting assembly is preferably a front lighting assembly of a motor vehicle.

BACKGROUND ART

Front lighting assemblies of a motor vehicle are known, essentially comprising:
- a frame fixed to the body of the motor vehicle;
- a lamp placed inside the frame; and
- a transparent cover placed at the end of the frame and connected to the frame.

In greater detail, the lamp comprises:
- a light source comprising for example LED lights; and
- an optical deflection element, for example a reflecting mirror of at least partly paraboloid shape, on which the light emitted by the light source strikes and provided to reflect a plurality of light rays that are substantially rectilinear towards the transparent cover and hence outwards of the motor vehicle.

The reflector is, in a known way, shaped as a concave surface open towards the transparent cover.

The transparent cover is formed by a lens which provides a desired conformation to the light rays reflected by the reflector.

In the case of LED light sources, the frame of lighting assemblies of known type further houses:
- a light source control unit adapted to control the light sources, based for example on road conditions and particular user settings;
- a PCB; and
- a heat sink.

U.S. Pat. No. 5,438,485 describes a lamp for a lighting assembly, comprising:
- a remote light source;
- a reflector defining a first paraboloid-shaped reflecting surface; and
- a light guide, e.g. an optical fibre, which transmits the light from the remote light source into the reflector with a certain conic angle.

The lamp further comprises:
- a converging lens that collects the light rays exiting the light guide; and
- a second reflecting surface, e.g. a spherical mirror.

The light rays exiting the converging lens strike the spherical mirror, which reflects these light rays towards the reflector.

The spherical mirror is arranged on the focal axis of the paraboloid-shaped reflector.

Thanks to the paraboloid shape, the reflector reflects the light rays in a substantially rectilinear way outside the lighting assembly.

The reflector, the spherical mirror and converging lens are fixed to the light guide.

Consequently, in the event of damage to the lighting assembly, e.g. due to impact, the spherical mirror and the converging lens must be removed from the light guide carried by the body.

If the motor vehicle is re-styled or if the final position of the lighting assembly is changed during the development of the motor vehicle, it is also necessary to completely reposition the light guide with respect to the body of the motor vehicle, since the spherical mirror and the converging lens are fixed to the aforesaid light guide.

Therefore, the need is felt in the sector to reduce the costs associated with the complete replacement of the components housed in the frame and/or connected with the re-styling of the motor vehicle or with the change of position of the lighting assemblies during the development of the motor vehicle.

More specifically, the need is felt in the sector to reduce these costs by preserving the possibility of adjusting the orientation and the distribution of the light rays generated by the lighting assembly in the horizontal and vertical planes, especially when the aforesaid lighting assembly is arranged at the front portion of the motor vehicle.

Furthermore, the need is felt in the sector to have the maximum flexibility with regard to the dimensions and shapes of the light generated by the lighting assembly without compromising the energy efficiency of the lighting assembly itself.

Finally, there is a need in the sector to reduce the overall dimensions of the lighting assembly compared to solutions of known type, up to reaching vertical height values in the order of magnitude of one third compared to the solutions of known type.

DISCLOSURE OF INVENTION

Aim of the present invention is to realise a lighting assembly for a vehicle which allows to satisfy at least one of the needs specified above in a simple and economical way.

According to the invention, this aim is achieved by a lighting assembly for a vehicle.

The present invention also relates to a method for removing a lighting assembly from a vehicle.

BRIEF DESCRIPTION OF THE DRAWINGS

For a better understanding of the present invention, three preferred non-limiting embodiments are described below, purely by way of example and with the aid of the attached drawings, in which:

FIG. 1 is a side view with parts removed for clarity's sake of a front portion of a first embodiment of a motor vehicle realized according to the dictates of the present invention;

FIG. 2 is a partially sectioned side view on an enlarged scale of a lighting assembly incorporated in the motor vehicle of FIG. 1, with parts indicated schematically;

FIG. 3 is a schematic side view on a further enlarged scale of the lighting assembly of FIGS. 1 and 2 and of some components of the motor vehicle; and FIG. 4 is a top view of the lighting assembly of FIGS. 1 to 3;

FIG. 5 is a schematic side view of a lighting assembly incorporated in a second embodiment of a motor vehicle realized according to the dictates of the present invention;

FIG. 6 is a schematic side view of a lighting assembly incorporated in a third embodiment of the motor vehicle realized according to the dictates of the present invention; and FIG. 7 is a view from the car of the motor vehicle according to the invention.

BEST MODE FOR CARRYING OUT THE INVENTION

With reference to FIG. 7, number 1 denotes a motor vehicle, in particular a motor vehicle, realized according to the invention and comprising a body 2 and a plurality of lighting assemblies 3a, 3b, 3c, 3d.

It should be noted that in the remainder of this description, expressions such as "upper", "lower", "front", "rear" and the like are used with reference to conditions of normal advancement of the motor vehicle 1.

It should also be noted that in the following description, the expression "light ray" means the path ideally followed by a rectilinear ray of light with infinitesimal thickness, according to the approximation of the geometric optics. In this approximation, the light rays travel in a homogeneous medium and with a negligible wavelength compared to the dimensions of the surfaces with which it interacts.

In greater detail, the motor vehicle 1 defines:
- a direction X parallel to the normal direction of advancement of the motor vehicle 1 and corresponding to a longitudinal direction of the motor vehicle 1;
- a direction Y orthogonal to the direction X and defining therewith a horizontal plane P (FIG. 7); and
- a direction Z orthogonal to the directions X and Y and defining with the direction Y a vertical plane Q (FIG. 2).

The directions X, Y, Z and the planes P, Q are integral with the motor vehicle 1.

The directions X, Y define respective longitudinal and transverse directions of the motor vehicle 1.

The body 2 comprises, in particular:
- a front portion 10 provided with a pair of assemblies 3a, 3b adapted to provide respective front lights to the motor vehicle 1;
- a rear portion 11 provided with a pair of assemblies 3c, 3d adapted to provide rear lights of the motor vehicle 1 and further assemblies (not shown) adapted to provide a light relative to the subwoofer or to the positioning of a spare wheel not shown in the motor vehicle 1; and
- an intermediate portion 12 interposed between the front portion 10 and the rear portion 11, and provided with a further assembly (not shown) adapted to provide a light to a central console of the dashboard of the motor vehicle 1.

In particular, the intermediate portion 11 comprises, in turn:
- a compartment 13 for housing an engine; and
- a hood 14 movable with respect to the body 2 between an open position in which it allows access to the compartment 13 to a closed position in which it obstructs access to the compartment 13.

The rear portion 11 comprises, in turn:
- a compartment 32 for housing luggage; and
- a tailgate 40 movable with respect to the body 2 between an open position in which it allows access to the compartment 32 and a closed position in which it obstructs access to the compartment 32.

The intermediate portion 11 comprises, in turn:
- a passenger compartment 33; and
- a plurality of side doors 41, each of which is movable with respect to the body 2 between an open position in which it allows access to the passenger compartment 33 and a closed position in which it obstructs access to the passenger compartment 33.

The motor vehicle 1 also comprises a light energy source 15 adapted to power the assemblies 3a, 3b, 3c, 3d, 3e with the light energy necessary for their operation.

In the case shown in FIG. 7, the source 15 is arranged in the intermediate portion 12 of the motor vehicle 1.

Alternatively, the source 15 could be arranged in the front portion 10 or in the rear portion 11 of the motor vehicle 1.

The source 15 comprises, in the case shown, a plurality of LED lights.

Alternatively, the source 15 could comprise a plurality of laser lights.

The motor vehicle 1 further comprises, for each assembly 3a, 3b, 3c, 3d:
- a respective optical fibre 16 to transmit the light generated by the source 15; and
- a respective lens 18 arranged at an output 17 of the optical fibre 16.

The optical fibre 16 of each assembly 3a, 3b, 3c, 3d provides at an output 17 a plurality of light rays 22 inclined with respect to an axis parallel to the direction X.

The lens 18 of each assembly 3a, 3b, 3c, 3d is configured to refract the light rays 22 provided at the output of the optical fibre 16 and to form the light rays 23 parallel to the direction X.

In the case shown, the lens 18 is a converging lens.

The optical fibre 16, the lens 18 and the source 15 are fixed to the body 2.

The motor vehicle 1 further comprises (FIG. 2), for each assembly 3a, 3b, 3c, 3d:
- a command lever 35 (only schematically shown) operable by a user and adapted to command the relative optical assembly 3a, 3b, 3c, 3d; and
- a control unit 34 programmed to command the source 15, based on the actuation of the command lever 35.

The command lever 35 and the control unit 34 are fixed to the body 2.

The motor vehicle 1 further comprises, for each assembly 3a, 3b, 3c, 3d:
- a base 36 to support the source 15, e.g. a printed circuit board if the source 15 comprises LEDs; and
- a heat exchanger 37 provided to disperse the heat generated by the source 15.

The base 36 and the heat exchanger 37 are fixed to the body 2.

In particular, the base 36 is fixed to the source 15.

The motor vehicle 1 comprises, in particular:
- at least one assembly 3a, 3b adapted to project a high light beam in front of the motor vehicle 1; and
- at least one assembly 3a, 3b adapted to project a down light beam in front of the motor vehicle 1.

In the following of the present description only the assembly 3a is described, it being clear that all the assemblies 3a, 3b, 3c, 3d are identical to each other.

The assembly 3a comprises, in turn:
- a frame 50 removably mounted on the front portion 10 of the body 2 and defining a front opening 51; and
- a transparent cover 52 arranged to close the frame 50.

The light rays 29 strike on the transparent cover 52 and are refracted by the transparent cover 52 itself so as to provide a plurality of light rays 20 projected in front of the motor vehicle 1 (FIG. 7).

In the case shown, the frame 50 is connected to the body 2 by removable connection means, for example a shape coupling 80.

The assembly 3a comprises:
- an optical assembly 53 configured to deflect the light rays 23 and to form a plurality of light rays 28; and
- a lens 54 configured to refract the light rays 28 incident thereon and to reflect light rays 29 on the transparent cover 52.

The optical assembly 53 comprises, in turn:
- a fixed portion 45 with respect to the frame 50; and
- a movable portion 46, the position of which is adjustable with respect to the frame 50 so as to make the light rays 28 orientable in the planes P and/or Q.

Advantageously, the lens 54 and the optical assembly 53 are fixed to the frame 50 and are removable from the body 2 integrally to the frame 50.

More particularly, the lens 54 and the optical assembly 53 are decoupled from the body 2, the optical fibre 16 and the lens 18.

Accordingly, the lens 54 and the optical assembly 53 can be removed from the body 2 integrally to the frame 50 without intervening on the optical fibre 16 and on the lens 18.

Even more particularly, the frame 50 with the lens 54 and the optical assembly 53 are removable from the front portion 10 when the hood 14 is in the open position.

In the case shown, the frame 50 with the lens 54 and the optical assembly 53 can be extracted from the front portion 10 parallel to the direction X.

The fixed portion 45 of the optical assembly 53 comprises the mirror 55.

The movable portion 46 of the optical assembly 53 comprises the mirror 56 and the lens 54.

The mirror 55 reflects the light rays 23 so as to generate a plurality of light rays 24 transverse to the light rays 23 and to the directions X, Z.

The mirror 56 reflects the light rays 24 so as to generate the light rays 28.

The mirror 56 is movably fixed to the frame 50. The mirror 55 has a fixed position with respect to frame 50.

In greater detail, the mirror 56 is fixed to the frame 50 in a movable manner parallel to the direction Y and/or parallel to the direction Z.

In particular, the mirror 56 is hinged to the frame 50 about a first axis parallel to the direction Y and/or about a second axis parallel to the direction Z, so as to allow the inclination of the reflecting surface 58 with respect to the frame 50 to be adjusted in the plane P and/or the plane Q.

The mirrors 55, 56 are normally arranged inclined with respect to the direction X.

The lens 54 is a diverging lens, on which the light rays 28 parallel to the direction X strike and which refracts the diverging light rays 29 directed towards the transparent cover 52.

The lens 54 is preferably movably fixed to the frame 50.

In greater detail, the lens 54 is fixed to the frame 50 in a movable manner parallel to the direction Y and/or parallel to the direction Z.

In particular, the lens 54 is hinged to the frame 50 about a first axis parallel to the direction Y and/or about a second axis parallel to the direction Z.

More particularly, the lens 54 is integral with the mirror 56, so that the inclination of the light rays 29 with respect to the frame 50 can be adjusted in the plane P and/or the plane Q.

Depending on the positioning of the optical assembly 53, in particular of the inclination of the surface 58 of the mirror 56, and of the lying of the lens 54 with respect to the planes P and/or Q, the light beam 29 is projected along a certain direction in the planes P and/or Q.

In the embodiment shown in FIG. 7, the source 15 is of the LED type and provides light according to a plurality of single colours. The optical fibre 16 comprises a plurality of beams 90 receiving light from the source 15 according to respective individual colours.

The light exiting from the beams 90 is recomposed at the output 17 so as to obtain the desired colour effects, intensity variation and on-off sequences, based on the command given to the command lever 34.

In use, the command lever 34 is actuated to obtain a predetermined light function by the assemblies 3a, 3b, 3c, 3d.

Based on the actuation given to the command lever 34, the control unit 35 commands the source 15.

The heat sink 37 dissipates the thermal energy generated by the source 15 inside the body 2.

In the following of this description the operation of one of the assemblies 3a is described, the operation of the assemblies 3b 3c, 3d being similar to each other.

In greater detail, the optical fibre 16 transmits the light generated by the source 15 up to the output 17.

The light bounces back several times inside the optical fibre 16 until the light rays 22 with a certain angle of inclination with respect to the direction X, at the output 17 are formed.

The lens 18 refracts the diverging light rays 22 outputted by the optical fibre 16 and forms the light rays 23 parallel to the direction X.

Within the frame 50, the light rays 23 are reflected by the mirror 55, so as to generate the light rays 24 transversely to the light rays 23.

The mirror 56 then reflects the light rays 24, so as to generate the light rays 28 directed towards the lens 54.

The lens 54 refracts the light rays 28 so as to form the light rays 29 incident on the transparent cover 52.

The transparent cover 52, in turn, refracts the light rays 29 by generating the light rays 20 projected in front of the motor vehicle 1.

Depending on the actuation imposed on the command lever 34, the control unit 35 adjusts the inclination of the mirror 56 and, therefore, of the lens 54 integral therewith in the planes P, Q.

Accordingly, the transparent cover 52 directs the light rays 20 in front of the motor vehicle 1 according to a desired orientation in the planes P and/or Q.

More precisely, the integral rotation of the surface 58 of the mirror 56 and of the lens 54 with respect to the frame 50 parallel to the directions Y and/or Z allows varying the position of the light rays 28 with respect to the frame 50.

Consequently, it is possible to adjust the position of the light rays 20 in the planes P, Q, depending on the command imposed by the user on the command lever 35 or automatically depending on the weight on the motor vehicle 1.

In the event of damage to the assembly 3a, 3b, the hood 14 is placed in the open position and the frame 50 is extracted from the body 2 parallel to the direction X (FIG. 2) and without intervening on the optical fibre 16 and on the lens 18. Once the frame 50 has been removed from the body 2, the mirrors 55, 56 and the lens 54 are completely extracted, it is possible to replace the assembly 3a, 3b.

Similarly, in the case of a re-styling of the motor vehicle 1 involving a change in the end position of the assembly 3a, 3b, the mirror 56 and the lens 54 are oriented with respect to the frame 50 so as to ensure that the light rays 20 are again in the correct position.

With reference to FIG. 6, number 3a' denotes a lighting assembly incorporated in a motor vehicle according to a second embodiment of the invention.

The assembly 3a' is similar to assembly 3a and will be described hereinafter only in so far as it differs from the latter; equal or equivalent parts of the assemblies 3a, 3a' will be marked, where possible, by the same reference numbers.

The assembly 3a' differs from the assembly 3a in that it comprises a mirror 59' optically interposed between the mirrors 55 and 56.

The mirror 59' has a fixed position with respect to the frame 50.

The mirror 59' is configured to reflect the light rays 24' from the mirror 55 and to generate a plurality of light rays 25' directed towards the mirror 56.

The mirror 59' comprises a reflecting surface 72', which is optically interposed between the reflecting surfaces 57, 58.

The light rays 24', 25' are transverse to the directions Y, Z.

The operation of the assembly 3a' differs from the operation of the assembly 3a in that inside the frame 50, the light rays 24' strike on the mirror 59' and are refracted by the mirror 59' so as to generate the light rays 25'.

The mirror 56 then reflects the light rays 25', so as to generate the light rays 28 directed towards the lens 54.

With reference to FIG. 6, number 3a" denotes a lighting assembly incorporated in a motor vehicle according to a third embodiment of the present invention.

The assembly 3a" is similar to assembly 3a and will be described hereinafter only in so far as it differs from the latter; equal or equivalent parts of the assemblies 3a, 3a" will be marked, where possible, by the same reference numbers.

The assembly 3a" differs from the assembly 3a in that the optical assembly 53 comprises a pair of optical prisms 60", 100" in place of the mirrors 55, 56.

The optical prisms 60", 100" are arranged consecutively to each other parallel to the direction X.

In particular, the optical prism 60" comprises:
a face 61", on which the light rays 23 refracted by the lens 18 strike;
a transparent body 62" crossed by the light rays 70" refracted by the face 61"; and
a face 63", on which the light rays 70" are incident and which is configured to refract the light rays 24" directed towards the optical prism 100".

In particular, the transparent body 62" is a prism with a trapezoidal base delimited, in the case shown:
from the faces 61", 63" to the part of the lens 18 and of the optical prism 100", respectively; and
by a pair of faces 64", 65" opposite each other and parallel to each other, and interposed between the faces 61", 63".

Similarly, the optical prism 100" comprises:
a face 101", on which the light rays 24" strike and which is configured to refract the light rays 100";
a transparent body 102" crossed by the light rays 110" refracted by the face 101"; and
a face 103", on which the light rays 110" are incident and which is configured to refract the light rays 28" directed towards the lens 54".

In particular, the transparent body 102" is a prism with a trapezoidal base delimited, in the case shown:
from the faces 101", 103" to the part of the optical prism 60" and of the lens 54, respectively; and
by a pair of faces 104", 105" opposite each other and parallel to each other, and interposed between the faces 101", 103".

The faces 61", 63", 64", 65" and 101", 103", 104", 105" define a pair of bases of the optical prisms 60", 100" shaped as isosceles trapezoids, in the case shown.

The aforesaid isosceles trapezoids have major bases defined by the faces 64", 105"; minor bases defined by the faces 65", 104"; and oblique sides defined by the faces 61", 63" and 101", 103".

More particularly, the faces 61", 101" and 64", 104" are arranged substantially in correspondence with each other parallel to the direction X.

The faces 64", 65", 104", 105" are orthogonal to the direction Z, in the case shown.

The faces 61", 63", 64", 65"; 101", 103", 104", 105" are flat.

The optical prism 100" is hinged to the frame 50 about an axis parallel to the direction Y and/or an axis parallel to the direction Z, so as to be able to selectively adjust the lying of the faces 101", 103" with respect to the frame 50 itself and, consequently, the orientation of the light rays 28" in the planes P and/or Q.

The lens 54 is movable parallel to the direction Y and/or to the direction Z integrally with the optical prism 100", so as to be able to adjust the orientation of the light rays 29 in the planes P and/or Q.

The operation of the assembly 3a" differs from the operation of the assembly 3a" in that within the frame 50, the light rays 23 strike on the face 61" of the optical prism 60" and are refracted inside the transparent body 62" forming the light rays 70".

The light rays 70" are, in turn, refracted by the face 63" of the optical prism 60" and form the light rays 24" incident on the face 101" of the optical prism 100".

The light rays 24" strike on the face 101" of the optical prism 100" and are refracted inside the transparent body 102" forming the light rays 110".

The light rays 110" are, in turn, refracted by the face 103" of the optical prism 100" and form the light rays 28" incident on the lens 54.

Furthermore, the operation of the assembly 3a" differs from the operation of the assembly 3a in that the inclination of the optical prism 100" and, therefore, of the lens 54 with respect to the frame 50 parallel to the directions Y and/or Z makes it possible to vary the position of the light beams 110", 28" and, consequently, to adjust the position of the light rays 29 in the planes P, Q, depending on the command imposed by the user to the command lever 35 or automatically depending on the weight on the motor vehicle 1.

From an examination of the characteristics of the assembly 3a, 3b, 3c, 3d; 3a'; 3a' according to the present invention, the advantages it provides are evident.

In greater detail, the lens 54 and the optical assembly 53 are fixed to the frame 50 and removable from the body 2 integrally to the frame 50.

More particularly, the lens 54 and the optical assembly 53 are decoupled from the body 2, the optical fibre 16 and the lens 18.

Accordingly, the lens 54 and the optical assembly 53 can be removed from the body 2 integrally to the frame 50 without intervening on the optical fibre 16 and on the lens 18.

This allows, in case of damage to the assembly 3a, 3b, 3c, 3d; 3a'; 3a" to remove the frame 50 from the body 2 without intervening on the optical fibre 16 and the lens 18. Once the frame 50 has been removed from the body 2, the mirrors 55, 56; 55, 56, 59' (or the optical prism 60", 100") and the lens 54 are completely extracted, and it is possible to replace the assembly 3a, 3b, thus greatly limiting maintenance costs.

Similarly, in the case of a re-styling of the motor vehicle 1 involving a change in the end position of the assembly 3a, 3c, 3b, 3d; 3a'; 3a", the mirror 56/optical prism 100" is rotated with respect to the frame 50 so as to ensure that the light rays 29 are again in the correct position, without intervening in any way on the optical fibre 16 and on the lens 18 carried by the body 2, thereby greatly limiting the costs due to the re-styling itself.

Thanks to the fact that the frame 50 does not house either the optical fibre 16 or the lens 18, and due to the fact that the optical assembly 53 is miniaturised, it is possible to reduce the overall dimensions of the assembly 3a, 3b, 3c, 3d; 3a', 3b' compared to the solutions of known type up to reaching vertical height values in the order of 15 mm.

Furthermore, it is possible to create additional space within the frame 50 to integrate new functions such as Lidar or Radar devices for ADAS.

Thanks to the possibility of configuring the optical assembly 53 in a variety of shapes, it is possible to have maximum flexibility with regard to the dimensions, the colours, the intensity and the shapes of the light generated by the assembly 3a, 3b, 3c, 3d; 3a'; 3a" without affecting the energy efficiency of the lighting assembly 3a, 3b, 3c, 3d; 3a'; 3a" itself.

More precisely, such flexibility is optionally obtained by dividing the optical fibres 16 into respective beams 90 coupled to the source 15 so as to obtain diversified colours at the input to such beams 90 which can be optionally joined at the output 17.

Finally, thanks to the fact that the mirror 56 (movable prism 100") has an adjustable position with respect to the frame 50, it is possible to adjust the position in the horizontal and vertical plane of the light rays 29, based on the indications given to the command lever 35 or automatically based on the weight of the motor vehicle 1.

It is clear that the assembly 3a, 3b, 3c, 3d; 3a'; 3a" described and shown herein may be subject to modifications and variations without thereby departing from the scope of protection defined by the claims. In particular, the motor vehicle 1 could be a motorcycle, a jet ski or any land/sea/air vehicle fitted with a lighting assembly.

When arranged in the rear portion 11, the lighting assembly 3c, 3d is replaced by placing the tailgate 40 in the open position.

When arranged in the intermediate portion 12, the lighting assembly 3a, 3b, 3c, 3d; 3a'; 3a" according to the invention is replaced by placing one of the side doors 41 in the open position.

The assembly 3a, 3b, 3c, 3d; 3a'; 3a" could comprise a light guide instead of the optic fibre 16.

One or more of the lens 54, the mirror 56, 56" and the optical prism 100" could be mounted on a joint fixed to the frame 50 so as to be inclinable parallel to the directions Y, Z.

The assembly 3a", 3b" may comprise only one of the optical prisms 60", 100" or more than two optical prisms 60", 100'.

The assembly 3a" could realize both a high and low beam light distribution or any further light distribution, for example by suitably shaping a surface of the mirror 56 opposite to the surface 58 and by rotating the mirror 56 by one hundred and eighty degrees when it is desired to vary the aforesaid light distribution.

Finally, the assembly 3a, 3b, 3c, 3d; 3a'; 3a" could comprise a light guide instead of the optic fibre 16.

The invention claimed is:

1. A vehicle, comprising:
   a body;
   a light source fixed to said body;
   means for transmitting the light generated, in use, by said source, configured to transmit a plurality of sixth light rays at an output thereof;
   said sixth light rays being inclined with respect to an axis parallel to a normal direction or advancement of the vehicle;
   a removable lighting assembly for the vehicle, the removable lighting assembly comprising:
   a frame removably mounted on said body;
   at least one first lens configured to refract, in use, at least a first light ray incident thereon outside said lighting assembly, the at least one first lens moveably attached to the frame; and
   an optical assembly configured to deflect, in use, at least a second light ray from a source arranged, in use, outside said frame and to generate said first light ray;
   wherein said first lens and said optical assembly are attached to said frame;
   wherein the optical assembly includes a first optical element and a second optical element, the first optical element positioned to receive the second light ray and emit a fourth light ray, the second optical element positioned between the first lens and the first optical element and to receive the fourth light ray, the first optical element is non-moveably fixed to the frame and the second optical element is moveably attached to the frame; and
   wherein the light source and means for transmitting light are arranged outside said frame and fixed to said body; and
   said first lens and said optical assembly being decoupled from said transmission means.

2. The vehicle according to claim 1, wherein said first optical element comprises a first mirror defining a first reflecting surface adapted to reflect said second light ray.

3. The vehicle according to claim 2, wherein said second optical element comprises a second mirror defining a second reflecting surface optically interposed between said first reflecting surface and said first lens;
   said second reflecting surface being attached to said frame; and
   wherein, in use, said frame is removable from said vehicle with said second reflecting surface being constrained to said frame.

4. The vehicle according to claim 3, wherein a position of at least one between said first and second reflecting surfaces with respect to said frame is adjustable.

5. The vehicle according to claim 4, wherein said first reflecting surface is fixed with respect to said frame, and in that the position of said second surface is adjustable with respect to said frame.

6. The vehicle according to claim 5, wherein the position of said second surface is adjustable to the position of said first lens with respect to said frame.

7. The vehicle according to claim 1, wherein the first optical element includes a first optical prism defining:
   a first refracting surface) adapted to refract said second light ray and to form at least a third light ray; and
   a second refracting surface adapted to refract said third light ray a second time and to form a fourth light ray.

8. The vehicle according to claim 7, wherein said first optical prism has a fixed position with respect to said frame.

9. The vehicle according to claim 7, further wherein the second optical element includes a second optical prism optically interposed between said optical prism and said first lens.

10. The vehicle according to claim 9, wherein said second optical prism has an adjustable position with respect to said frame.

11. The vehicle according to claim 10, wherein said second optical prism and said first lens are adjustable integrally with each other.

12. The vehicle according to claim 9, wherein said second optical prism comprises, in turn:
- a third refracting surface adapted to refract said fourth light ray and to form at least a fifth light ray; and
- a fourth refracting surface adapted to refract said fifth light ray a second time and to form said first light ray.

13. The vehicle according to claim 1, further comprising a second lens constrained to said body, optically interposed between said transmission means and said optical assembly, and configured to refract said sixth light ray and to form said second light ray.

14. The vehicle according to claim 13, wherein said second lens is a converging lens.

15. The vehicle according to claim 1, further comprising a control unit programmed to control said source and arranged outside said frame and fixed to said body.

16. The vehicle to claim 1, further comprising means for thermal dissipation of the heat generated, in use, by said source, arranged outside said frame and fixed to said body.

17. The vehicle according to claim 1, wherein said source includes an LED source adapted to provide a plurality of different colours from each other, and in that said transmission means comprise a plurality of optical pathways coupled to said LED source and, in use, each optical pathway receives a respective colour.

18. The vehicle according to claim 1, wherein said source includes a laser.

19. The vehicle according to claim 1, wherein said transmission means comprises an optical fibre.

20. The vehicle according to claim 1, wherein said body defines a front portion with reference to a normal direction of travel of the vehicle; said assembly being fixed to said front portion.

* * * * *